(12) United States Patent
Park et al.

(10) Patent No.: US 9,041,266 B2
(45) Date of Patent: May 26, 2015

(54) MAGNETIC BEARING STRUCTURE AND TURBO MACHINE HAVING THE SAME

(75) Inventors: Cheol Hoon Park, Daejeon (KR); Sang-Kyu Choi, Daejeon (KR); Sang Yong Ham, Daejeon (KR); Dong-Won Yun, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 331 days.

(21) Appl. No.: 13/583,691

(22) PCT Filed: Mar. 10, 2011

(86) PCT No.: PCT/KR2011/001676
§ 371 (c)(1),
(2), (4) Date: Sep. 10, 2012

(87) PCT Pub. No.: WO2011/112019
PCT Pub. Date: Sep. 15, 2011

(65) Prior Publication Data
US 2013/0009501 A1 Jan. 10, 2013

(30) Foreign Application Priority Data
Mar. 11, 2010 (KR) .................. 10-2010-0021869

(51) Int. Cl.
*F16C 32/04* (2006.01)
(52) U.S. Cl.
CPC ........ *F16C 32/0476* (2013.01); *F16C 32/0465* (2013.01)
(58) Field of Classification Search
USPC ............................................ 310/89–90, 90.5
See application file for complete search history.

(56) References Cited

U.S. PATENT DOCUMENTS

| 4,609,332 A * | 9/1986 | Miki et al. ..................... 417/352 |
| 6,288,465 B1 * | 9/2001 | Suzuki et al. ................ 310/90.5 |
| 6,351,049 B1 * | 2/2002 | Chassoulier et al. ........ 310/90.5 |

(Continued)

FOREIGN PATENT DOCUMENTS

| CN | 101235845 | 8/2008 |
| CN | 101235848 | 8/2008 |

(Continued)

OTHER PUBLICATIONS

Korean Patent Office, PCT Search Report & Written Opinion of PCT/KR2011/001676 filed on Mar. 10, 2011.

*Primary Examiner* — Thanh Lam
(74) *Attorney, Agent, or Firm* — Lexyoume IP Meister, PLLC

(57) ABSTRACT

Disclosed is a magnetic bearing structure including a permanent magnet, levitating a rotation body without a bias current, and easily magnetizing the permanent magnet. The magnetic bearing structure includes a ring-shaped permanent magnet provided on a side of a rotation shaft and magnetized in a direction parallel with a shaft direction of the rotation shaft, a coil installed on a side of the permanent magnet, and a conductor installed on an external side of the coil and used to form a magnetic field path. According to the configuration, when an additional bias current is not supplied to the coil installed in the magnetic bearing, a rotation body levitates according to the magnetic field caused by the permanent magnet, and a magnetized direction of the permanent magnet is in parallel with a shaft direction of the rotation shaft thereby allowing easy magnetization and increasing productivity of the magnetic bearing.

6 Claims, 6 Drawing Sheets

(56) References Cited

U.S. PATENT DOCUMENTS

| | | | |
|---|---|---|---|
| 6,373,156 B2 * | 4/2002 | Suzuki et al. | 310/68 B |
| 6,570,286 B1 * | 5/2003 | Gabrys | 310/90.5 |
| 6,703,735 B1 | 3/2004 | Gabrys | |
| 8,215,898 B2 | 7/2012 | Nakazeki et al. | |
| 2005/0198956 A1 | 9/2005 | Fremerey | |

FOREIGN PATENT DOCUMENTS

| | | |
|---|---|---|
| CN | 101693726 | 4/2010 |
| JP | 06-081839 A | 3/1994 |
| JP | 06-101715 A | 4/1994 |
| JP | 06-173948 A | 6/1994 |
| JP | 07-042735 A | 2/1995 |
| JP | 08-210353 A | 8/1996 |
| JP | 10-501326 A | 2/1998 |
| JP | 11-101235 A | 4/1999 |
| JP | 11-303867 A | 11/1999 |
| JP | 2001-349371 A | 12/2001 |
| JP | 2002-257135 A | 9/2002 |
| JP | 2002-257136 A | 9/2002 |
| JP | 2005-522632 A | 7/2005 |
| JP | 4039077 B2 | 11/2007 |
| JP | 4352170 B2 | 8/2009 |
| KR | 10-2006-0038088 A | 5/2006 |
| KR | 10-0980565 | 8/2009 |
| KR | 10-0976631 | 8/2010 |
| WO | 95-34763 A | 12/1995 |

* cited by examiner

MAGNETIC BEARING STRUCTURE AND TURBO MACHINE HAVING THE SAME

CROSS-REFERENCE TO RELATED APPLICATION

This application is a National Stage application of PCT/KR2011/001676 filed on Mar. 10, 2011, which claims priority to Korean Patent Application No. 10-2010-0021869 filed in the Korean Intellectual Property Office on Mar. 11, 2010, the entire contents of which are incorporated herein by reference.

BACKGROUND OF THE INVENTION (a) Field of the Invention

The present invention relates to a magnetic bearing structure and a turbo machine having the same, and it particularly relates to a magnetic bearing structure for using a permanent magnet and an electromagnet in a magnetic bearing provided on a side of a rotation body to allow the electromagnet to control a position of the rotation body and allow the permanent magnet to generate a bias magnetic field, and then control a magnetized direction of the permanent magnet to correspond to a shaft direction of a rotation shaft thereby facilitating magnetization, and a turbo machine having the same.

(b) Description of the Related Art

A magnetic bearing device has been widely used for various kinds of precision machine devices. The magnetic bearing device levitates a rotation body and supports it according to a magnetic force generated by an electromagnet. With devices using a magnetic bearing, a shaft does not contact the bearing so dust caused by abrasion is suppressed, a lubricant is not used, and noise is reduced.

A general rigid body has six degrees of freedom (DOF). However, a conventional rotation body rotates the shaft so five DOF excluding a rotation movement of the rotation shaft must be controlled. Therefore, the magnetic bearing applicable to a 5-shaft control device for controlling the entire five DOF is classified as a radial magnetic bearing and an axial magnetic bearing.

Regarding the magnetic bearing, conductor surfaces facing each other pull the rotation body and increase or reduce a magnetic force depending on a position change of the rotation body to stably support the rotation body. However, in this instance, a predetermined bias magnetic force must be applied to the rotation body according to a load caused by the rotation body. To form the bias magnetic force, a permanent magnet is used as well as an electromagnet. Here, to divide paths of magnetic fields of the electromagnet and the permanent magnet, a magnetic bearing structure for using a method for providing a donut-shaped permanent magnet between a pair of electromagnets has been proposed.

In the case of the above-structured magnetic bearing, the magnetized direction of the donut-shaped permanent magnet must be perpendicular to the shaft direction of the rotation body, that is, the permanent magnet must be magnetized in a radius direction of the permanent magnet. However, the magnetization method is difficult and production efficiency of the magnetic bearings can be worsened. Therefore, it is required to provide a magnetic bearing structure for easily magnetizing the permanent magnet while dividing the magnetic field paths of the permanent magnet and the electromagnet.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a magnetic bearing structure for dividing paths of magnetic fields of an electromagnet and a permanent magnet to intercept interference of the paths thereof and to provide easy magnetization of the permanent magnet, and a turbo machine having the same.

An exemplary embodiment of the present invention provides a magnetic bearing structure including: a ring-shaped permanent magnet provided on a side of a rotation shaft and magnetized in a direction in parallel with a shaft direction of the rotation shaft; a conductor installed on an external side of the permanent magnet and used to form a magnetic field path; and a coil installed inside the conductor.

The magnetic bearing structure further includes a support contacting the permanent magnet and connected to the same, and the magnetic field path caused by the permanent magnet is formed through the rotation shaft by the support.

The rotation shaft further includes a rotation plate, and the magnetic field path is formed through the rotation plate.

A non-magnetic material is filled in an empty space formed inside the conductor.

A gap is formed between the rotation plate and the conductor.

Another embodiment of the present invention provides a turbo machine including: a housing; a rotation shaft installed inside the housing; a power transmitter connected to the rotation shaft and transmitting power; and a magnetic bearing applied to the rotation shaft wherein the magnetic bearing includes: a ring-shaped permanent magnet provided on a side of the rotation shaft and wrapping the rotation shaft; a conductor installed on an external side of the permanent magnet and used to form a magnetic field path; and a coil installed inside the conductor, wherein the permanent magnet is magnetized in a direction parallel with a shaft direction of the rotation shaft.

The turbo machine further includes a rotation plate connected to the rotation shaft, and a magnetic field path of the permanent magnet is formed through the rotation plate.

A gap is formed between the rotation plate and the conductor.

The turbo machine further includes a support contacting the permanent magnet and connected to the same, and a magnetic field path caused by the permanent magnet is formed through the rotation shaft by the support.

The turbo machine further includes a rotation plate connected to the rotation shaft, and a magnetic field path of the permanent magnet is formed through the rotation plate.

A gap is formed between the rotation plate and the conductor.

A non-magnetic material is filled in an empty space formed inside the conductor.

According to the embodiments of the present invention, the paths of the magnetic fields of the electromagnet and the permanent magnet are divided, an additional bias current is not applied to the electromagnet by the bias magnetic field caused by the permanent magnet, and the magnetized direction of the permanent magnet corresponds to the shaft direction of the rotation body, thereby facilitating magnetization of the permanent magnet and improving productivity of the magnetic bearing.

DETAILED DESCRIPTION OF THE EMBODIMENTS

Exemplary embodiments of the present invention will now be described in detail with reference to accompanying drawings.

Figure 1:
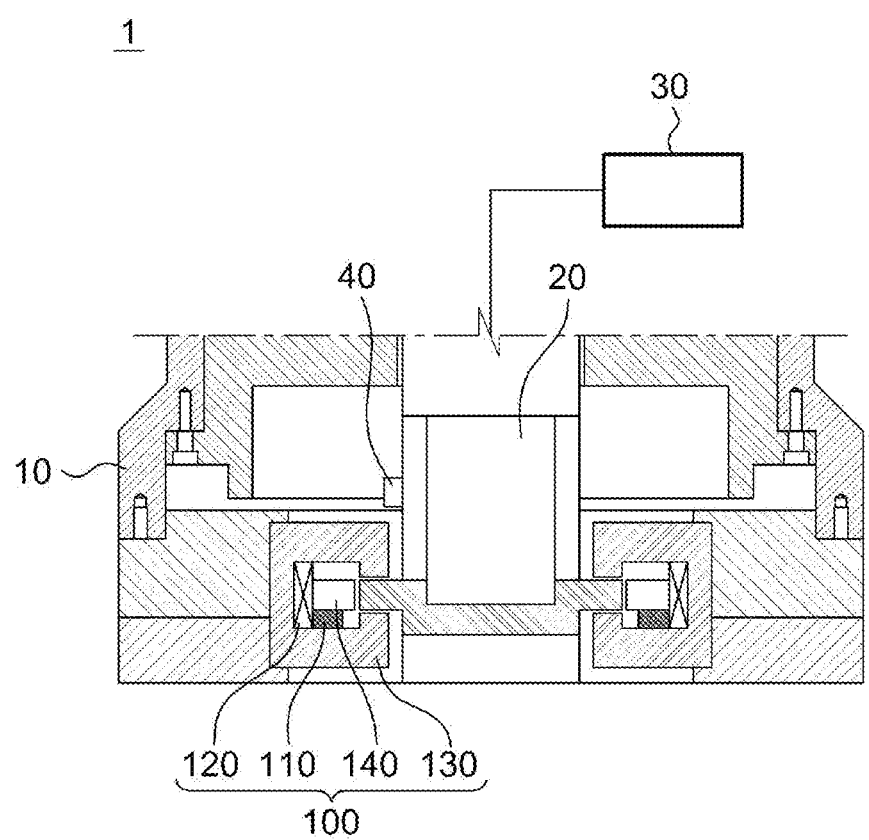
FIG. 1 shows a cross-sectional view of a turbo machine with a magnetic bearing structure according to an exemplary embodiment of the present invention.

FIG. 1 shows a cross-sectional view of a turbo machine 1 with a magnetic bearing structure according to an exemplary embodiment of the present invention.

The turbo machine 1 according to an exemplary embodiment of the present invention includes a housing 10, a rotation shaft 20, a power transmitter 30, and a magnetic bearing 100. The turbo machine 1 includes a multi-purpose turbo machine used for a general machine tool, and particularly includes a small turbo machine.

The housing 10 provides a space for receiving the rotation shaft 20, and the rotation shaft 20 covers a case in which the rotation shaft is driven while it is set to be perpendicular and a case in which it is driven while it is set to be horizontal. The power transmitter 30 includes a generally-used motor, and the power transmitter 30 can be provided inside or outside the housing 10. The magnetic bearing 100 is provided on a side of the rotation shaft 20 while supporting the rotation shaft on the side.

Figure 2:
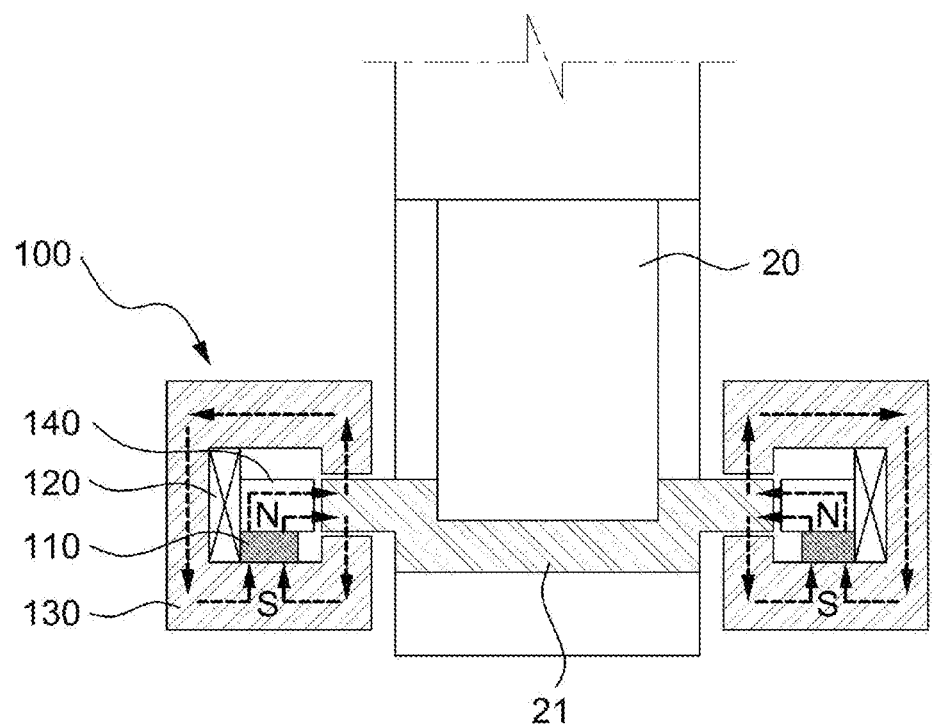
FIG. 2 shows a cross-sectional view of a magnetic bearing shown in FIG. 1.
Figure 3:
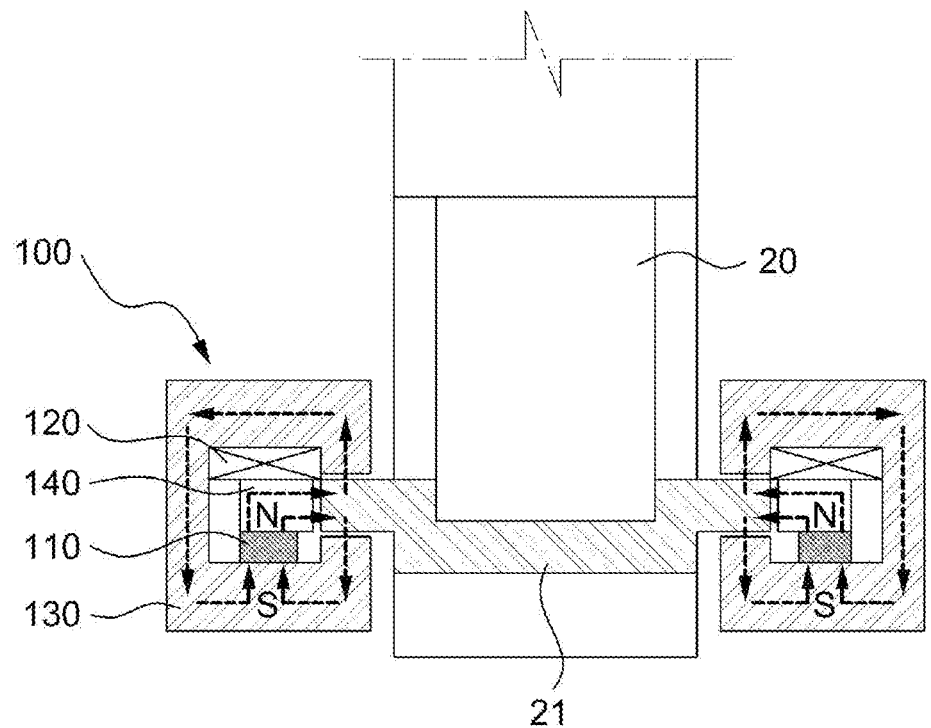
FIG. 3 and FIG. 4 show cross-sectional views of a magnetic bearing according to another exemplary embodiment of the present invention.
Figure 4:
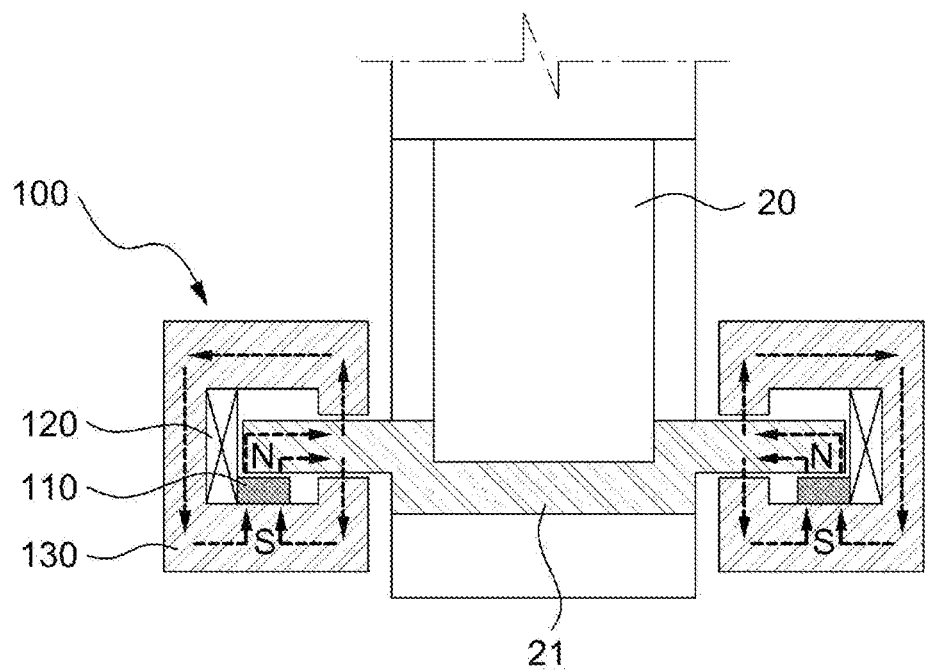

The magnetic bearing 100 includes a permanent magnet 110, a coil 120, and a conductor 130. A further detailed description will now be given with reference to FIG. 2 to FIG. 4. FIG. 2 shows a cross-sectional view of a magnetic bearing 100 further including a support 140, FIG. 3 shows a cross-sectional view of a modified exemplary variation in which a position of a coil 120 is changed in an exemplary embodiment shown in FIG. 2, and FIG. 4 shows a cross-sectional view of a magnetic bearing 100 without the support 140.

The permanent magnet 110 is a ring type, and it is provided on a side of the rotation shaft 20. A magnetic circuit for biasing the rotation shaft 20 is formed by the permanent magnet 110 while an additional current influencing the bias of the rotation shaft 20 is not supplied, so the rotation shaft 20 floats. FIG. 2 and FIG. 3 show a magnetic field formed by the permanent magnet 110. It is exemplified in this case that a rotation plate 21 is additionally provided to the rotation shaft 20 and the rotation plate 21 levitates, or that the rotation shaft 20 and the rotation plate are integrally formed and they levitate. Also, the rotation shaft 20 or rotation plate 21 is made of a conductor.

In this instance, the magnetized direction of the permanent magnet 110 is set to be in parallel with the shaft direction of the rotation shaft 20. That is, the N polarity or the S polarity does not proceed to the rotation shaft because of magnetization of the permanent magnet 110, so compared to the magnetic bearing having another permanent magnet magnetized perpendicularly with respect to the direction of the rotation shaft, a formation of the magnetic field influencing the bias of the rotation shaft 20 formed by the permanent magnet 110 does not become symmetrical. However, in general, the fact that transmittivity of the conductor 130 is good and the formation of the bias magnetic field does not become symmetrical does not significantly influence levitation of the rotation shaft 20 or the rotation plate 21 caused by the bias magnetic field of the permanent magnet 110.

Therefore, a bias flux formed by the permanent magnet 110 passes through the rotation shaft 20 or the rotation plate 21 and the conductor 130, it returns to the permanent magnet 110, and the rotation shaft 20 or the rotation plate 21 levitates.

The coil 120 is provided on a side of the permanent magnet 110. The coil 120 is exemplified to be formed outside the permanent magnet 110 and have a ring shape for wrapping the rotation shaft 20, but the shape is not restricted to this. That is, it can be formed as a pair facing each other with respect to the rotation shaft 20. The current flows to the coil 120 to form a magnetic field so as to control the levitation position of the rotation shaft 20 or the rotation plate 21. That is, as the position of the rotation shaft 20 or the rotation plate 21 is changed in the shaft direction, a size or direction of the current is changed to control the position change of the shaft direction of the rotation shaft 20 or the rotation plate 21. A detailed drive will be described later.

A conductor 130 influencing formation of a path of the magnetic field is provided outside the coil 120 and the permanent magnet 110. The conductor 130 influences formation of paths of the magnetic field for biasing the rotation shaft 20 or the rotation plate 21, formed by the permanent magnet 110 and the magnetic field for controlling the position change of the rotation shaft 20 or rotation plate 21, formed by the coil 120. A gap is formed between the conductor 130 and the rotation plate 21. That is, in general, a sensor 40 for sensing the gap is provided inside or outside the magnetic bearing 100, and as the gap is changed depending on the sensor 40, the size or direction of the current supplied to the coil 120 is changed to maintain the gap within a predetermined range and control the position change of the rotation shaft 20 or the rotation plate 21.

The magnetic bearing 100 further includes a support 140. The support 140 is exemplified to contact the permanent magnet 110 and be connected thereto. The support 140 is desirably formed with a conductor. The support 140 contacts the permanent magnet 110 and is connected thereto, and the magnetized direction of the permanent magnet 110 is in parallel with the shaft direction of the rotation shaft 20 so the N polarity or the S polarity caused by magnetization contacts the support 140. In this instance, the path of the magnetic field generated by the permanent magnet 110 is formed by the rotation shaft 20 or the rotation plate 21 through the support 140. In this case, a form of the magnetic field influencing the bias of the rotation shaft 20 formed by the permanent magnet 110 does not become symmetrical. However, in a like manner of the above description, the fact that the formation of the bias magnetic field does not become symmetrical does not significantly influence the levitation of the rotation shaft 20 or the rotation plate 21 caused by the bias magnetic field of the permanent magnet 110.

When the support 140 is provided, a gap is also formed between the conductor 130 and the rotation plate 21. That is, in general, the sensor 40 for sensing the gap influences the magnetic bearing 100, and as the gap is changed depending on the sensor 40, the size or direction of the current supplied to the coil 120 is changed to maintain the gap within a predetermined range and control the position change of the rotation shaft 20 or the rotation plate 21.

As shown in FIG. 3, the permanent magnet 110 is provided in the space inside the conductor 130, the support 140 is provided thereon, and the coil 120 is provided thereon. The function of the coil 120 in the case corresponds to the above description.

Further, by the disposal of the above constituent elements, an empty space surrounded by the coil 120, the conductor 130, and the support (140, wherein the support 140 is exchangeable with a rotation plate 21) is formed, and it is desirable to fill the empty space with a non-magnetic material such as Cu or Al. In a like manner of the conductor 130, the filled non-magnetic material is used to form the path of the magnetic field and it supports the coil 120.

A drive of a turbo machine 1 using a structure of a magnetic bearing 100 according to the present invention will now be described with reference to FIG. 2, FIG. 5, and FIG. 6. The drive including the support 140 will be exemplarily described, and the drive case with the support 140 has the same principle.

The magnetic bearing 100 is used for the rotation shaft 20, and in this instance, it is desirable for the rotation shaft 20 to exemplarily include the rotation plate 21 and for the magnetic bearing 100 to be used for the rotation plate 21. In this instance, the rotation plate 21 is formed with a conductor.

When the magnetic bearing 100 is used for the rotation plate 21, as shown in FIG. 2, the rotation plate 21 levitates by the magnetic field generated by the permanent magnet 110. In this instance, the magnetized direction of the permanent magnet 110 is in parallel with the shaft direction of the rotation shaft 20 so that the formation of the magnetic field does not become symmetrical. The formation does not significantly influence levitation of the rotation plate 21.

When the rotation shaft 20 is rotated according to an operation of the turbo machine 1, the rotation plate 21 is rotated, and in this instance, the rotation plate 21 is rotated while changing the position in the shaft direction. Therefore, it is needed to control the position change of the rotation plate 21 within a predetermined range. In general, the position change of the rotation plate 21 can be checked by detecting a displacement of the rotation plate 21 through the sensor 40 attached to the inside or the outside of the magnetic bearing 100.

Figure 5:
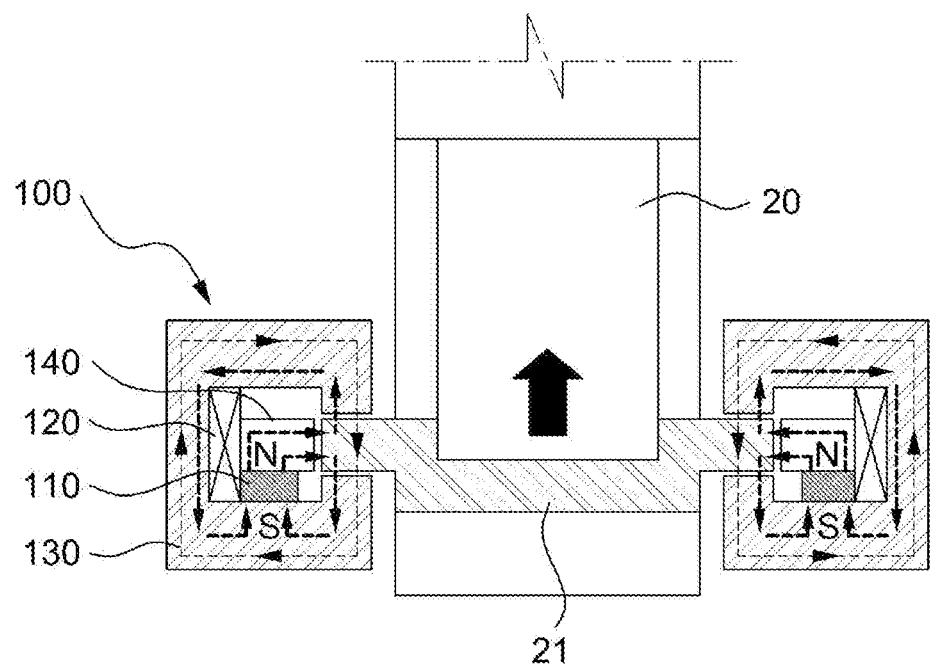
FIG. 5 and FIG. 6 show cross-sectional views of a drive of a magnetic bearing.

When the rotation plate 21 moves downward in the drawing as shown in FIG. 5, the magnetic field formed by the permanent magnet 110 is increased or reduced by the magnetic field formed by the coil 120, the size or the direction of the current flowing to the coil 120 is controlled so that the direction of the magnetic field going downward may be greater than the magnetic field going upward, and the rotation plate 21 is moved upward.

Figure 6:
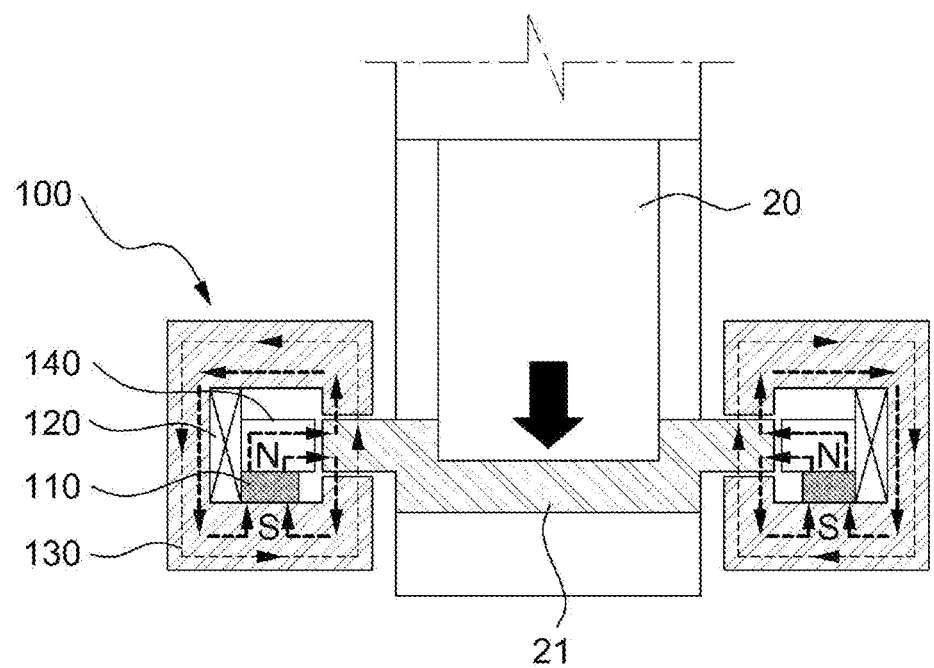

When the rotation plate 21 is moved upward in the drawing, as shown in FIG. 6, the magnetic field formed by the permanent magnet 110 is increased or reduced by the magnetic field formed by the coil 120, the size or the direction of the current flowing to the coil 120 is controlled so that the direction of the magnetic field going upward may be greater than the magnetic field going downward, and the rotation plate 21 is moved downward.

By controlling the position of the rotation plate 21 as described, the gap is maintained between the rotation plate 21 and the conductor 130 within a predetermined range.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The scope of the present invention should therefore not be construed as limited to the exemplary embodiments set forth herein, and should be defined by the appended claims and equivalents thereof.

What is claimed is:

1. A magnetic bearing structure comprising:
   a ring-shaped permanent magnet provided on a side of a rotation shaft including a rotation plate and magnetized in a direction parallel with a shaft direction of the rotation shaft;
   a conductor installed on an external side of the permanent magnet and used to form a magnetic field path;
   a coil installed inside the conductor; and
   a support contacting a N polarity or a S polarity of the permanent magnet and connected to the same, and
   wherein the magnetic field path caused by the permanent magnet is formed through the rotation plate by the support.

2. The magnetic bearing structure of claim 1, wherein a non-magnetic material is filled in an empty space formed inside the conductor.

3. The magnetic bearing structure of claim 1, wherein a gap is formed between the rotation plate and the conductor.

4. A turbo machine comprising:
   a housing;
   a rotation shaft including a rotation plate installed inside the housing;
   a power transmitter connected to the rotation shaft and transmitting power; and
   a magnetic bearing applied to the rotation shaft, wherein the magnetic bearing includes:
   a ring-shaped permanent magnet provided on a side of the rotation shaft and magnetized in a direction parallel with a shaft direction of the rotation shaft;
   a conductor installed on an external side of the permanent magnet and used to form a magnetic field path;
   a coil installed inside the conductor; and
   a support contacting a N polarity or a S polarity of the permanent magnet and connected to the same, and
   wherein the magnetic field path caused by the permanent magnet is formed through the rotation plate by the support.

5. The turbo machine of claim 4, wherein a gap is formed between the rotation plate and the conductor.

6. A magnetic bearing structure of claim 4, wherein a non-magnetic material is filled in an empty space formed inside the conductor.

* * * * *